United States Patent
Yamamoto

(12)
(10) Patent No.: US 6,277,908 B1
(45) Date of Patent: Aug. 21, 2001

(54) NON-HALOGENATED FIRE RETARDANT RESIN COMPOSITION AND WIRES AND CABLES COATED THEREWITH

(75) Inventor: Yasuaki Yamamoto, Ibaraki-ken (JP)

(73) Assignee: Boreals A/S, Lyngby (DK)

( * ) Notice: Subject to any disclaimer, the term of this patent is extended or adjusted under 35 U.S.C. 154(b) by 0 days.

(21) Appl. No.: 08/487,226

(22) Filed: Jun. 7, 1995

Related U.S. Application Data

(63) Continuation of application No. 08/018,336, filed on Feb. 23, 1993, now abandoned, which is a continuation of application No. 07/769,281, filed on Oct. 1, 1991, now abandoned.

(30) Foreign Application Priority Data

Aug. 23, 1991 (JP) .................................... 3-212129

(51) Int. Cl.$^7$ ................. C08K 3/10; C08K 5/54; C08L 83/04
(52) U.S. Cl. .............. 524/436; 524/269; 524/433; 524/437; 524/504; 525/103; 525/106
(58) Field of Search .................. 525/103, 106; 524/504, 269, 436, 433, 437

(56) References Cited

U.S. PATENT DOCUMENTS

| | | | |
|---|---|---|---|
| 4,497,925 | * 2/1985 | Abolins et al. | 525/106 |
| 4,560,719 | * 12/1985 | Nakamura et al. | 524/269 |
| 4,731,406 | 3/1988 | Itoh et al. | 524/436 |
| 4,801,639 | 1/1989 | Hoshi et al. | 524/112 |
| 4,829,119 | * 5/1989 | Ishino et al. | 524/436 |
| 4,839,412 | * 6/1989 | Harrell et al. | 524/436 |
| 4,871,787 | * 10/1989 | Yamamoto et al. | 523/122 |
| 4,983,742 | * 1/1991 | Yusawa et al. | 524/504 |
| 5,002,996 | 3/1991 | Okunda et al. | 524/436 |
| 5,063,266 | * 11/1991 | McRae | 524/269 |
| 5,104,920 | 4/1992 | Keogh | 524/264 |

FOREIGN PATENT DOCUMENTS

| | | |
|---|---|---|
| 614036 | 9/1989 | (AU) . |
| 280761 | 9/1988 | (EP) . |
| 296566 | 12/1988 | (EP) . |
| 334205 | 9/1989 | (EP) . |
| 466193 | 1/1992 | (EP) . |
| 1118554 | 5/1989 | (JP) . |
| 1172440 | 7/1989 | (JP) . |

\* cited by examiner

*Primary Examiner*—Robert Dawson
*Assistant Examiner*—Jeffrey B. Robertson
(74) *Attorney, Agent, or Firm*—Sughrue, Mion, Zinn, Macpeak & Seas, PLLC

(57) ABSTRACT

A flame retardant resin composition for electrical insulation and sheathing of wire and cables which has enhanced oil resistance and excellent processing characteristics, comprising (a) 100 parts by weight of a polyolefin polymer, (b) 50 to 200 parts by weight of a metal hydroxide or hydrated metal salt, (c) 3 to 20 parts by weight of a polyolefin based polymer or oligomer grafted or copolymerized with a vinyl bearing species, where polyolefin based polymer (c) differs from polyolefin polymer (a), and (d) 1 to 10 parts by weight of a silicone compound.

10 Claims, 1 Drawing Sheet

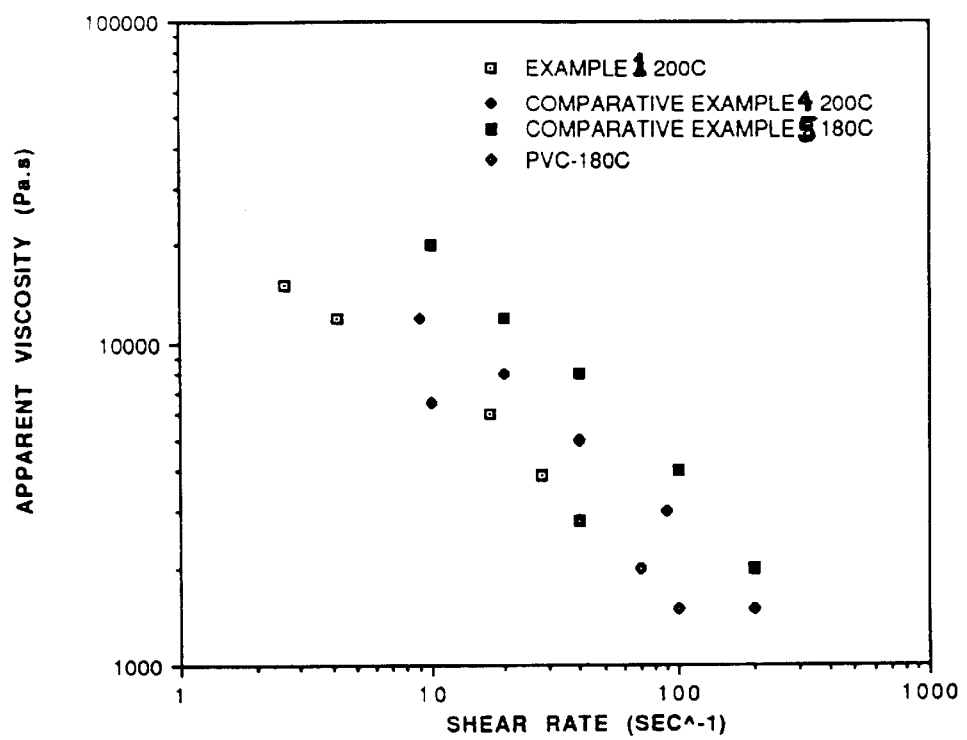
FIGURE 1: VISCOSITY VERSUS SHEAR RATE FOR RESIN COMPOSITIONS

NON-HALOGENATED FIRE RETARDANT RESIN COMPOSITION AND WIRES AND CABLES COATED THEREWITH

This is a continuation of application Ser. No. 08/018,336 filed on Feb. 23, 1993, now abandoned, which is a continuation of application Ser. No. 07/769,281 filed on Oct. 1, 1991, now abandoned.

BACKGROUND OF THE INVENTION

FIELD OF THE INVENTION

The present invention relates to a flame retardant electrically insulating compound that does not evolve toxic or corrosive gases as it burns. Such compounds are especially suited for use as insulation or sheathing for electrical wires and cables.

High rise buildings, power stations, various industrial plants, transit systems, such as subways and ships, are especially vulnerable to fire hazard. Due to the large number of people and the limited exits found in such environments, severe loss of life can occur in the event of a fire. Furthermore, if large amounts of smoke are generated exits and exit routes are obscured, loss of life occurs which would have been avoided if no such smoke condition had prevailed and rapid evacuation had thus been possible.

Additionally, fire can spread along wire or cable, especially in duct systems. Smoke and the harmful gaseous ignition products of a fire or smoldering material can be transported through, for example, air conditioning systems or subway tunnels and cause health hazards in areas remote from the original point of ignition.

Corrosion obviously causes severe damage to equipment. A fire in a telephone exchange, for example, can cause loss of life of people not involved at the fire site, due to corrosion induced failure of telephone, alarm and control systems and the subsequent loss of ability to contact emergency services.

Thus, there is a need for insulation and sheathing materials for wires and cables that are self extinguishing and which do not evolve toxic or corrosive gases or large amounts of smoke. Furthermore, fungal attack can occur in the confined, damp conditions in which such wires and cables are installed, particularly in transit systems and ships.

Resin compositions which do not evolve toxic and corrosive gases and have anti-fungal properties are described in U.S. Pat. No. 4,871,787.

A common problem which occurs with such resin compositions is that the incorporation of large amounts of metal hydroxides into polymeric materials has a deleterious effect on the tensile elongation of the resin compositions compared to the unmodified base polymers. Due to this low elongation, cracking and tearing of the insulation or sheath can take place during both installation and use.

A further effect is that the viscosity of such metal hydroxide loaded resin compositions is so high that they are very difficult to form into the final object. Slower extrusion rates and specialized high pressure equipment are required, especially when compared to flame retardant, low smoke compositions based on poly(vinyl chloride) polymers.

Thus, flame retardant commercial resin compositions known to the art which contain metal hydroxides generally compromise one or more of their properties to optimize one or more of the others. Such compromises could be avoided if it were possible to significantly reduce the amount of metal hydroxide present without reducing the flame retardancy of the resulting resin composition.

SUMMARY OF THE INVENTION

Accordingly, it is the object of the present invention to provide a novel resin composition which shows all the desired properties of a fire retardant resin composition, viz., a high degree of flame retardancy, good physical properties, superior tensile elongation, ease of fabrication and antifungal properties, and which contains significantly lower amounts of metal hydroxide(s) than those resin compositions known to the art.

Additionally, it is the object of the present invention to demonstrate that the resistance of such a resin composition to fluids such as oils and gasoline is also enhanced.

The objects of the present invention can be attained by a flame retardant, electrically insulating composition comprising (A) 100 parts by weight of a polyolefin (Polymer 1), (B) 50 to 200 parts by weight of metal hydroxide or a hydrated metal salt, (C) 3 to 20 parts by weight of a polyolefin polymer grafted or copolymerized with a vinyl containing species (Polymer 2) and (D) 1 to 10 parts by weight of a silicone containing material. Components (A) to (D) are essential components in accordance with the present invention. At least 0.2 parts by weight of an amine compound and typical amounts, known to the art, of stabilizers and process aids can optionally be present.

The present invention has been accomplished on the basis of the finding that the desired properties are obtained as the result of increased flame retardancy due to a novel synergy between a polyolefin polymer grafted or copolymerized with a vinyl containing species and a silicone material in a metal hydroxide or hydrated metal salt containing resin composition. This synergy holds if the resin composition is a thermoplastic or if it is crosslinked to form a thermoset material.

The resin composition of the present invention finds special use as electrical insulation and sheathing of electrical wires and cables, and the present invention is also directed to such a combination.

DESCRIPTION OF THE DRAWING

The FIGURE shows apparent viscosity versus shear rate data for Examples and Comparative Examples presented in the specification.

DETAILED DESCRIPTION OF THE PREFERRED EMBODIMENTS

Examples of the polyolefin (Polymer 1) that can be used are polyethylene and ethylene copolymers with $\alpha$-olefins such as propylene, butene, hexene, octene and 4-methylpentene-1, polypropylene, ethylene propylene elastomers, ethylene vinyl acetate copolymers, ethylene methyl acrylate copolymers, ethylene methylmethacrylate copolymers, ethylene ethyl acrylate copolymers, ethylene butyl acrylate copolymers, ethylene vinyl silane copolymers and terpolymers of the preceding materials. Blends, whether physically mixed or produced during reaction, can also be used. The melt index of Polymer 1 should lie in the range of about 0.05–about 200 dg/min, more preferably, about 0.1 to about 20 dg/min and most preferably 0.5–5 dg/min measured at 190° C. according to ASTM Method D 1238.

If ethylene copolymers or terpolymers are used as Polymer 1, the range of comonomer content (i.e., other than ethylene) can be 5% to 30% by weight based on total copolymer or terpolymer weight as Polymer 1. However, in consideration of such factors as heat distortion and mechanical strength, a comonomer content in the range of 5% to 20% by weight is preferred, same basis.

Polymer 1 differs from Polymer 2, and serves as a matrix to carry the fire-retardant additive(s). Polymer 2 illustrates a flame retardancy in combination with the silicone containing material greater than that shown by Polymer 2 used without the silicone containing material in the resin composition of the present invention. Polymer 2 increases the fire-retardancy of the resin composition as a whole as compared to an otherwise identical resin composition without Polymer 2.

Polymer 1 cannot be replaced by Polymer 2 because tensile properties would be so reduced as to make the resulting composition of no practical utility.

For Polymer 2, grafted materials as compared to copolymerized materials are preferred.

Polymer 1 provides physical strength to the resin composition of the present invention, e.g., excellent tensile elongation and Shore Hardness, so that the resin composition of the present invention exhibits not only both of such properties to a degree equal to or superior to the prior art, and in the resin composition has flame retardancy equal to or greater than that of prior art polyolefin-based resin compositions and ease of processability greater than corresponding prior art polyolefin-based compositions, i.e., will exhibit an ease of processability equivalent to those encountered with typical polyvinyl chloride based compositions, so that the same are extrudable with a low extruder pressure and at normal rates.

The base polymer or oligomer (an oligomer is a very low molecular weight polymer) for grafting or copolymerization with a vinyl bearing species to yield Polymer 2 can be any of the polyolefins, copolymers, terpolymers, or blends or mixtures thereof listed above for Polymer 1. Examples of the vinyl bearing species can be a vinyl hydroxy carboxylic acid, a vinyl carboxylic acid, a vinyl hydroxy dicarboxylic acid, a vinyl dicarboxylic acid, esters thereof and anhydrides thereof. It is contemplated that such acids which contain up to about 12 or more carbon atoms (in total) should prove potentially useful in the present invention. Esters with 1 to 4 carbon atoms in the ester moiety, i.e., methyl to butyl acrylate, are also contemplated as potentially useful.

Specific examples of vinyl carboxylic acids and vinyl hydroxy carboxylic acids are acrylic acid and hydroxy-acrylic acid, respectively. Specific examples of vinyl dicarboxylic acids are fumaric acid and maleic acid. A preferred anhydride is maleic anhydride.

The amount of the vinyl containing species grafted or copolymerized onto the base polymer to yield Polymer 2 is generally 0.1 to 20% by weight, more preferably 0.1 to 5% by weight, based on the weight of the base polymer. This range is especially applicable to the preferred vinyl containing species, maleic anhydride, and most especially when the maleic anhydride is grafted or copolymerized onto polyethylene or a polyethylene copolymer, a most preferred embodiment of the present invention.

The amount of Polymer 2 is 3–20 parts by weight per 100 parts by weight of Polymer 1, and preferably 7 to 15 parts by weight, same basis.

These ranges, of course, especially apply to the most preferred embodiment of the present invention just discussed, i.e., maleic anhydride (0.1 to 20%, more preferably 0.1 to 5% by weight) grafted or copolymerized onto polyethylene or a polyethylene copolymer.

Modification of Polymer 1 with Polymer 2 improves the compatibility of the metal hydroxide and Polymer 1 in the resulting resin composition, providing improved properties, most especially tensile properties.

In accordance with the present invention, a silicone material is used in an amount of 1 to 10 parts, more preferably 3 to 7 parts, by weight per 100 parts of Polymer 1.

Useful silicone containing materials can be characterized by the structure $-[Si(R_1, R_2-O)]_n-$ i.e., are organopolysiloxanes which can be liquids, gums or elastomeric solids, depending on the nature of $R_1$, $R_2$ and the molecular weight. ASTM has developed the following classifications for silicones as are useful in the present invention:

MQ—methylsilicone;
VMQ—methylvinylsilicone;
PMQ—methylphenylsilicone; and
PVMQ—methylphenylvinylsilicone.

All such silicone materials can be used in the present invention. It is preferred that the polysiloxane be either a liquid or a gum and most preferably in the form of a gum, that is, a sticky, tacky-like material. Most preferred as a silicone material is poly(dimethyl siloxane) used in an amount of 1 to 10 parts by weight, more preferably 3 to 7 parts by weight, per 100 parts by weight of Polymer 1, which is a cyclic dimethylsiloxane which contains 6 to 15 repeating siloxane units.

The composition of the present invention further comprises 50 to 200 parts by weight of a metal hydroxide or a hydrated metal salt.

The metal hydroxides and hydrated metal salts that are suitable for use in the present invention have an average particle size of 0.1–30 $\mu$m, preferably 0.5–15 $\mu$m.

If a metal hydroxide or hydrated metal salt to be used has been surface-treated with a suitable compound such as a fatty acid, a silane compound or a titanate compound, it will be dispersed in the polymers used sufficiently uniformly to produce a composition that has improved processibility in such applications as extrusion molding. Specific examples of such metal hydroxides and hydrated metal salts include aluminum hydroxide, magnesium hydroxide, basic magnesium carbonate (a typical hydrated metal salt), calcium hydroxide or hydrocalcite.

The amount of the metal hydroxide or hydrated metal salt to be incorporated must be in the range of 50–200 parts by weight per 100 parts per weight of Polymer 1 and most preferably 60–120 parts by weight, same basis. If this amount is less than 50 parts per weight, the desired flame resistance will not be imparted. If this amount exceeds 200 parts by weight, a reduction in extruding processability and mechanical strength will be brought about. The ranges are especially applicable to a magnesium hydroxide resin composition.

Typical surface treatment agents include fatty acid salts such as sodium stearate, fatty acids such as oleic acid, vinyl silanes such as vinyltriethyoxysilane, and conventional titanates. Surface treatment is conducted in a conventional manner using conventional amounts, for example, an amount of about 0.1 wt % based on the weight of the metal hydroxide or hydrated metal salt.

The most preferred of such materials for use in the present invention is magnesium hydroxide, next preferred is aluminum hydroxide, and third preferred is calcium hydroxide. Magnesium hydroxide permits use of a higher extrusion temperature due to its relatively high decomposition temperature (about 350° C.) as compared to aluminum hydroxide, which has a decomposition temperature of about 220° C. Calcium hydroxide is relatively soluble in water, and, thus, in wet environments can lead to problems. Mixtures can, of course, be used.

The amine compound optionally used in the present invention is a compound having at least one hydrogen atom in ammonia (NH$_3$) replaced by a hydrocarbon group R, and there are three kinds of amines, that is RH2, R$_2$NH AND R$_3$N. The present inventor has confirmed by experimentation (U.S. Pat. 4,871,787) that improved anti-fungal action can be imparted by the addition of an amine compound.

Specific examples of the amine compound that can be used in the present invention include: bis(phenylpropylidene)-4,4'-diphenylamine; N-isopropyl-N'phenyl-p-phenylenediamine; a polymer of 2,2,4-trimethyl-1,2-dihydroquinoline; 2,5-di-tert-butylhydroquinone; 2-mercaptobenzimidazole and 2-mercaptomethylbenzimidazole. Most preferred are mercapthbenzothiazole or a polymer of 2,2,4-trimethyl-1,2-dihydroquinoline.

The amount of amine optionally incorporated should be not less than 0.2 parts by weight per 100 parts by weight of the polyolefin. If this amount is less than 0.2 parts by weight, the desired anti-fungal action will not be attained. While there is no particular upper limit for this content, about 20 parts by weight could be given as a guide figure.

In addition to the essential ingredients earlier described and the optional amine, the composition may optionally contain carbon black, lubricants, process aids, antioxidants, softening agents and dispersants, all of which are conventional in the art.

The resin composition of the present invention may or may not be crosslinkable. If it is to be crosslinkable, organic peroxides as typified by dicumyl peroxide and 3-bis(tert-butylperoxylisopropyl)benzene can advantageously used as curing agents, e.g., in an amount of about 1–4 parts by weight per 100 parts by weight of Polymer 1. Such curing agents may be used in combination with curing assistants such as sulfur, ethylene dimethacrylate, diallyl phthalate and p-quinone dioxime. Crosslinking of the composition may be accomplished by irradiation by electron beams and, in such a case, generally, reactive monomers such as trimethylolpropane trimethacrylate and triallyl isocyanurate are added as curing assistants in conventional amounts. Usually a crosslinked resin composition herein will show a gel content of at least about 70% (decalin extraction test).

The following Examples and Comparative Examples are provided to further illustrate the present invention but are in no way to be construed as limiting.

In the Examples:

POLYMER 1 is an ethylene ethyl acrylate copolymer, melt index 0.8 dg/min, ethyl acrylate content 15% based on total weight of Polymer 1.

POLYMER 2 is a linear low density polyethylene density 0.915 g/cm$^3$, melt index 30 dg/min grafted with 1% maleic anhydride based on total weight of Polymer 2.

SILICONE is a cyclic dimethylsiloxane gum containing 6 to 15 repeating siloxane units and having a molecular weight of about 1,000 and a viscosity of 1×10$^6$ centipoise measured at 25° C.

FUNGICIDE is a polymer of 2,2,4-trimethyl-1,2-ihydroquinoline.

ANTIOXIDANT is 4,41-thiobis-(6-tert-butyl-3-methylphenol).

METAL HYDROXIDE is magnesium hydroxide of a particle size 1 μm surface treated or coated with about 0.1% sodium stearate based on the weight of magnesium hydroxide.

CARBON BLACK is a furnace black of particle size 30–35 mμand BET surface area 75 m$^2$/g.

PROCESS AID is stearic acid.

CROSSLINKING AGENT is dicumyl peroxide.

The non-crosslinkable compositions were mixed on a six-inch roll mill at 170° C. The crosslinkable formulation was similarly mixed at 120° C.

Plaque samples for evaluation were prepared for all compositions by hot pressing the roll mill compositions at 170° C.

The flame retardant properties of the resin compositions have been assessed by the method of limiting oxygen index (LOI) which has wide acceptance by specifying bodies as a measure of flame retardancy of materials.

LOI as determined by ASTM D 2863 is defined as the percentage of oxygen that it is necessary to add to a nitrogen atmosphere such that ignition of a test sample of a resin composition exposed to this mixed atmosphere will ignite.

Since air contains 21% oxygen a sample of resin composition which ignites in air will have an LOI of 21. Such a resin composition is obviously not flame retardant.

The degree to which the atmosphere has to be enriched with oxygen in excess of 21% to support ignition of a sample of a resin composition is therefore a measure of the flame retardancy of the resin composition.

The composition of Examples 1 and 2 and Comparative Examples 1 to 3 and their LOI values are shown in Table 1 below.

Comparative Example 1 is a typical resin composition as described in U.S. Pat. No. 4,871,787.

Comparative Example 2 is Comparative Example 1 to which 10 parts by weight of Polymer 2 has been added. The LOI of Comparative Example 2 is 1.5 units lower than that of Comparative Example 1.

Comparative Example 3 is Comparative Example 1 to which 5 parts by weight of a silicone has been added. The LOI of Comparative Example 3 is 9.9 units higher than that of Comparative Example 1.

Example 1 is Comparative Example 1 to which both Polymer 2 and silicone have been added. On the basis of the LOI values obtained for Comparative Examples 2 and 3, it would be expected that the LOI of Example 1 would be approximately 8 units higher than that of Comparative Example 1. In fact the LOI of Example 1 is 14.1 units higher than that of Comparative Example 1.

Example 2 is Example 1 crosslinked with dicumyl peroxide. It shows the same flame retardancy as Example 1.

Thus the addition of both Polymer 2 and silicone has an unexpected, novel, synergistic effect on the flame retardancy of metal hydroxide filled resin compositions.

TABLE 1

RESIN COMPOSITIONS

| COMPONENT | COMPARATIVE EXAMPLE 1 parts by weight | COMPARATIVE EXAMPLE 2 parts by weight | COMPARATIVE EXAMPLE 3 parts by weight | EXAMPLE 1 parts by weight | EXAMPLE 2 parts by weight |
|---|---|---|---|---|---|
| POLYMER 1 | 100 | 100 | 100 | 100 | 100 |
| METAL HYDROXIDE | 80 | 80 | 80 | 80 | 80 |
| POLYMER 2 | — | 10 | — | 10 | 10 |

TABLE 1-continued

RESIN COMPOSITIONS

COMPOUND

| COMPONENT | COMPARATIVE EXAMPLE 1 parts by weight | COMPARATIVE EXAMPLE 2 parts by weight | COMPARATIVE EXAMPLE 3 parts by weight | EXAMPLE 1 parts by weight | EXAMPLE 2 parts by weight |
|---|---|---|---|---|---|
| CARBON BLACK | 10 | 10 | 10 | 10 | 10 |
| SILICONE | — | — | 5 | 5 | 5 |
| FUNGICIDE | 0.5 | 0.5 | 0.5 | 0.5 | 0.5 |
| ANTIOXIDANT | 0.5 | 0.5 | 0.5 | 0.5 | 0.5 |
| PROCESS AID | 0.5 | 0.5 | 0.5 | 0.5 | 0.5 |
| CROSSLINKING AGENT | — | — | — | — | 1.7 |
| LOI (%) | 29.3–30.2 | 27.5–29.0 | 39.1–40.3 | 43.3–44.5 | 43.2–44.4 |
| INCREMENT IN LOI | — | MINUS 1.5 | 9.9 | 14.1 | 14.0 |

Comparative Examples 4 through 6 now presented are commercially available polyolefin based, metal hydroxide filled compositions which are widely used for the wire and cable applications described in the background of the present specification. Comparative Example 6 is used crosslinked with dicumyl peroxide.

From the density of these materials it can be readily calculated that they contain 150 to 200 parts by weight of metal hydroxide as compared to Example 1 which contains only 80 parts by weight.

For the synergy claimed for Example 1 to be real and thus meet the objectives of the invention, it is required that Example 1 should, when compared to Comparative Examples 4 and 5, and that Example 2 should, when compared to Comparative Example 6, show the following properties.

At least equivalent LOI value;

Comparable Tear Strength and Durometer Hardness;

At least double the Tensile Elongation; and

Comparable retention of Tensile Elongation after aging.

As is shown in Tables 2 and 3 below these requirements

TABLE 2

PROPERTIES OF THERMOPLASTIC RESIN COMPOSITIONS

| PROPERTIES OF RESIN COMPOSITIONS | EXAMPLE 1 | COMPARATIVE EXAMPLE 4 | COMPARATIVE EXAMPLE 5 |
|---|---|---|---|
| DENSITY @ 20° C. ASTM D 1505 | 1.27 | 1.50 | 1.57 |
| LIMITING OXYGEN INDEX ASTM D 2863 | 44 | 41 | 36 |
| TENSILE ELONGATION (%) ASTM D 638 | 503 | 190 | 127 |
| HEAT AGING 7 DAYS @ 100° C. % RETENTION TENSILE ELONGATION | 88 | 72 | 70 |
| TEAR STRENGTH (LB/IN) ASTM D 470 | 60 | 53 | 29 |
| DUROMETER HARDNESS (SHORE A) | 95 | 95 | 95 |

TABLE 3

PROPERTIES OF CROSSLINKED RESIN COMPOSITIONS

| PROPERITIES OF RESIN COMPOSITIONS | EXAMPLE 2 | COMPARATIVE EXAMPLE 6 |
|---|---|---|
| DENSITY @ 20° C. ASTM D 1505 | 1.27 | 1.52 |
| LIMITING OXYGEN INDEX ASTM D 2863 | 43 | 40 |
| TENSILE ELONGATION (%) ASTM D 638 | 450 | 200 |
| HEAT AGING 7 DAYS @ 100° C. % RETENTION TENSILE ELONGATION | 100 | 100 |
| TEAR STRENGTH (LB/IN) ASTM D 470 | 60 | 45 |
| DUROMETER HARDNESS (SHORE A) | 95 | 95 |

A further objective of the invention was to provide a material which shows enhanced oil resistance. Table 4 below shows that Example 1 is clearly superior (where TS=tensile strength and TE=tensile elongation).

TABLE 4

OIL RESISTANCE OF RESIN COMPOSITIONS

| PROPERTY | COMPARATIVE EXAMPLE 1 | EXAMPLE 1 | COMPARATIVE EXAMPLE 4 | COMPARATIVE EXAMPLE 5 |
|---|---|---|---|---|
| FLUID RESISTANCE 18 hrs. @ 70° C. % TS RETENTION/% TE RETENTEON | | | | |
| ASTM #2 OIL | 87/96 | 97/110 | 78/137 | 78/127 |
| FLUID RESISTANCE 24 hrs. @ 50° C. % TS RETENTION/% TE RETENTION | | | | |
| HYDRAULIC FLUID 5606 | 60/90 | 70/107 | 56/142 | 48/134 |
| HYDRAULIC FLUID 17672 | 70/90 | 90/110 | 84/100 | 75/104 |
| DIESEL OIL 16884 | 41/93 | 64/103 | 41/156 | 39/170 |
| LUBRICATING OIL 24467 | 64/95 | 81/114 | 70/137 | 69/123 |
| LUBRICATING OIL 23699 | 77/94 | 97/110 | 92/105 | 85/102 |
| FLUID RESISTANCE 24 hrs. @ 20° C. % TS RETENTION/% TE RETENTION | | | | |
| METHANOL | 87/100 | 101/105 | 87/153 | 82/102 |
| GASOLINE | 45/96 | 66/95 | 63/184 | 56/117 |

A further objective of the invention was to provide a material of reduced viscosity to provide ease of processing. Polyolefin resin compositions such as Comparative Examples 1 and 2 require special equipment and techniques for wire and cable extrusion due to their high viscosity. On the other hand, flame retardant poly(vinyl chloride) based resin compositions are known for their ease of extrusion using standard equipment and techniques.

The attached Figure shows viscosity shear rate data for Example 1, Comparative Examples 4 and 5 and PVC, a standard poly(vinyl chloride) based flame retardant resin composition, measured at their typical wire extrusion temperatures (200° C. for Example 1 and Comparative Example 4 and 180° C. for Comparative Example 5 and PVC).

Clearly example 1 is markedly less viscous by at least a factor of two at all shear rates, compared to comparative examples 4 and 5 and is comparable to PVC and thus will exhibit the same easy processing characteristics of the latter.

What is claimed is:

1. A flame retardant resin composition for electrical insulation in sheathing of wire and cables which has enhanced oil resistance and excellent processing characteristics, comprising:
   (a) 100 parts by weight of a polyolefin polymer;
   (b) 50 to 200 parts by weight of metal hydroxide or hydrated metal salts selected from the group consisting of aluminum hydroxide, magnesium hydroxide, calcium hydroxide, basic magnesium carbonate, and hydrocalcite, or mixtures thereof;
   (c) 3 to 20 parts by weight of a polyolefin based polymer oligomer grafted or copolymerized with a vinyl bearing species selected from the group consisting of a vinyl hydroxy carboxylic acid, a vinyl carboxylic acid, a vinyl hydroxy dicarboxylic acid, a vinyl dicarboxylic acid, and esters and hydrides thereof;
   (d) 1 to 10 parts of an organopolysiloxane compound; and
   (e) at least 0.2 parts by weight of an amine compound;
wherein components (b)–(d) are all based on 100 parts by weight of polyolefin polymer (a) and polyolefin (c) differs from olefin (a).

2. An electrical wire or cable surrounded by a sheathing material comprising:
   (i) a blend of 36 to 65 percent by weight of:
      (A) at least one resin selected from the group consisting of ethylene/vinyl acetate copolymer and ethylene/ethyl acrylate copolymer; and
      (B) a copolymer of ethylene and an alpha-olefin wherein the alpha-olefin has 8 carbon atoms;
   (ii) (C) 1.1 to 11.7 percent by weight of a polyethylene modified or grafted with an unsaturated diacid anhydride;
   (iii) (D) 28 to 66 percent by weight of an inorganic flame retardant; and
   (iv) (E) 0.37 to 6.1 percent by weight of a silicone compound.

3. The electrical wire or cable according to claim, wherein component (i) has a melt index in a range from about 0.1 to about 20 dg/min measured at 190° C. according to the ASTM method D 1238.

4. The electrical wire or cable according to claim 3, wherein the sheathing material has tear strength according to ASTM D 470 of about 29 to 53.

5. The electrical wire or cable according to claim 3, wherein the sheathing material has a tensile elongation after aging 7 days at 100° C. of about 70 to 100%.

6. The electrical wire or cable according to claim 2, wherein component (i) has a melt index in a range from about 0.1 to about 20 dg/min measured at 190° C. according to the ASTM method D 1238, and wherein the unsaturated diacid anhydride of component (ii) is maleic anhydride.

7. The electrical wire or cable according to claim 6, wherein the sheathing material has tear strength according to ASTM D 470 of about 29 to 53.

8. The electrical wire or cable according to claim 6, wherein the sheathing material has a tensile elongation after aging 7 days at 100° C. of about 70 to 100%.

9. The electrical wire or cable according to claim 6, wherein component (i) has a melt index of 0.8 dg/min and an ethyl acrylate content of 15% of the total weight of (i).

10. The electrical wire or cable according to claim 6, wherein the sheathing material has tear strength according to ASTM D 470 of about 45.

* * * * *